Figure 4:
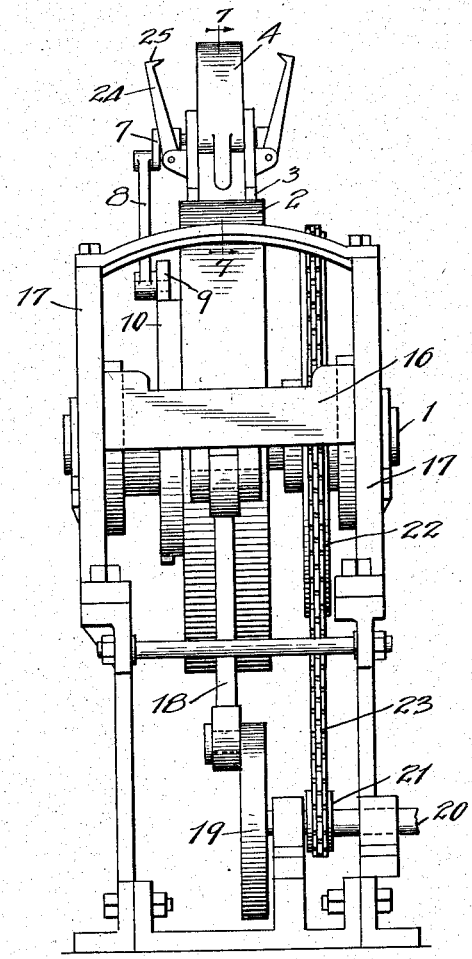
Figure 5:
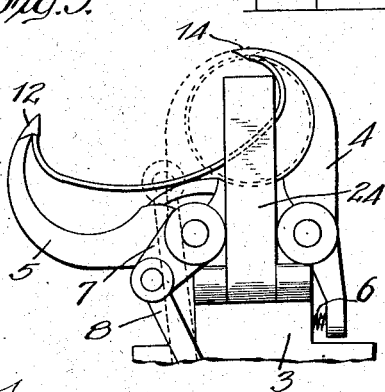
Figure 6:
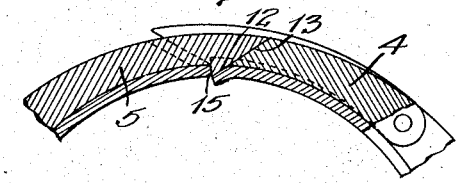

H. N. McEWEN & W. J. ANTHONY.
VENEER OR PAPER PACKAGING MACHINE.
APPLICATION FILED MAY 29, 1917.
1,289,497.
Patented Dec. 31, 1918.
5 SHEETS—SHEET 1.
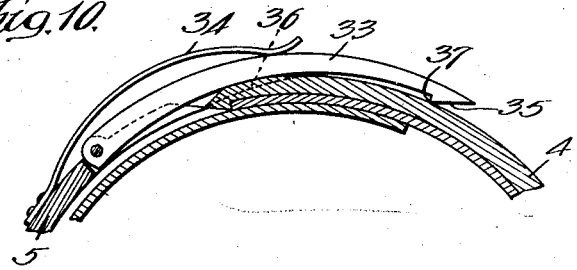
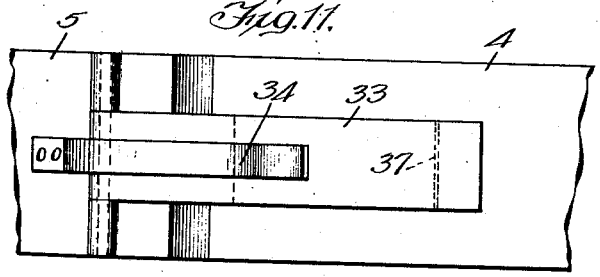
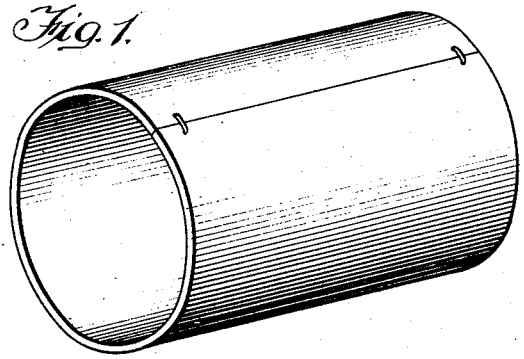
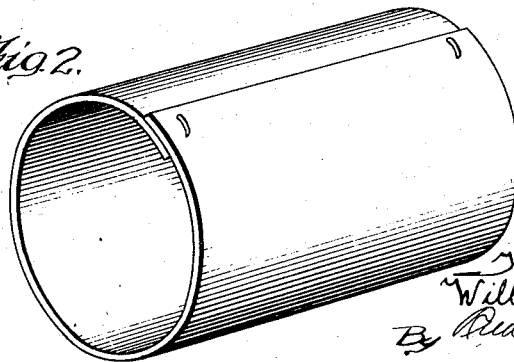

H. N. McEWEN & W. J. ANTHONY.
VENEER OR PAPER PACKAGING MACHINE
APPLICATION FILED MAY 29, 1917.
1,289,497.
Patented Dec. 31, 1918.
5 SHEETS—SHEET 2.
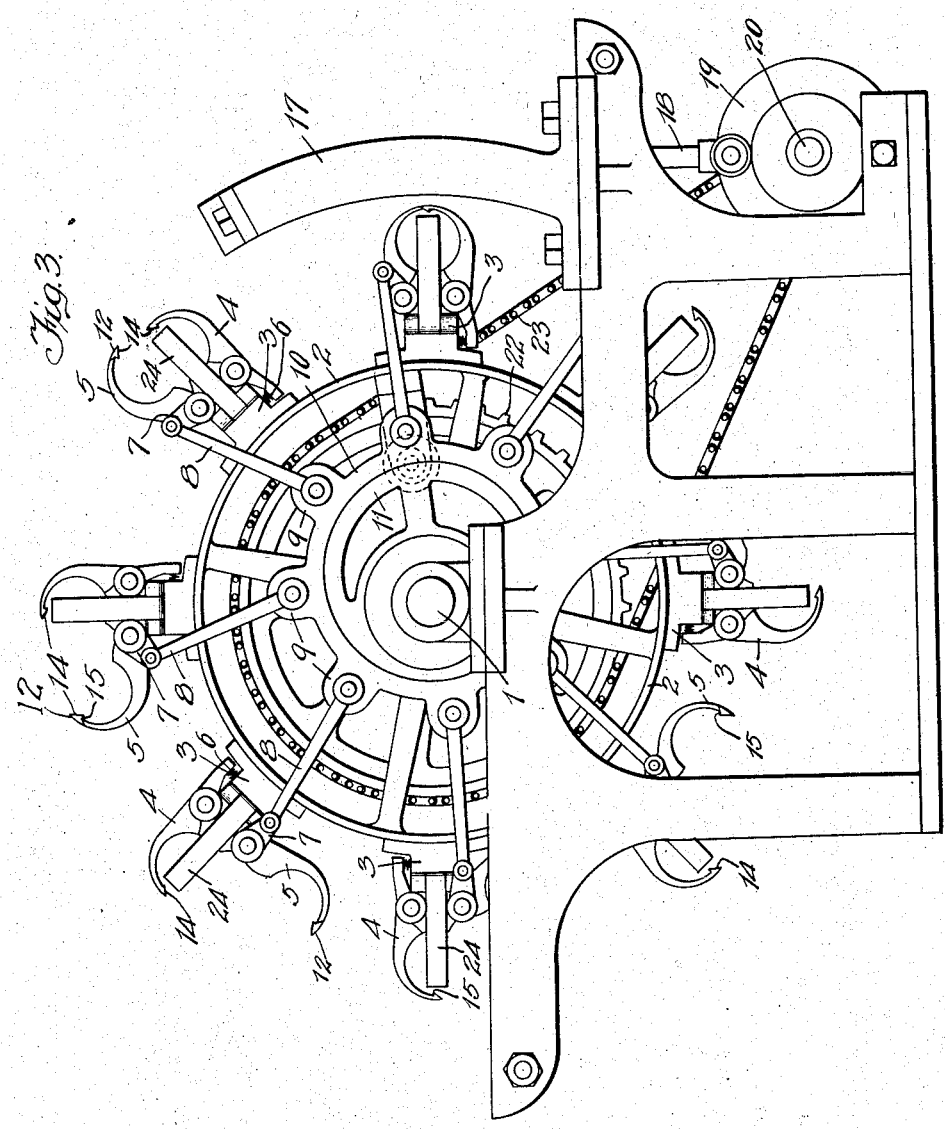

H. N. McEWEN & W. J. ANTHONY.
VENEER OR PAPER PACKAGING MACHINE.
APPLICATION FILED MAY 29, 1917.

1,289,497.

Patented Dec. 31, 1918.
5 SHEETS—SHEET 3.

Witnesses:
W. P. Kilroy
Harry R. L. White

Inventors
Harry N. McEwen
Willis J. Anthony
By Rudolph Wm. Lotz
Atty.

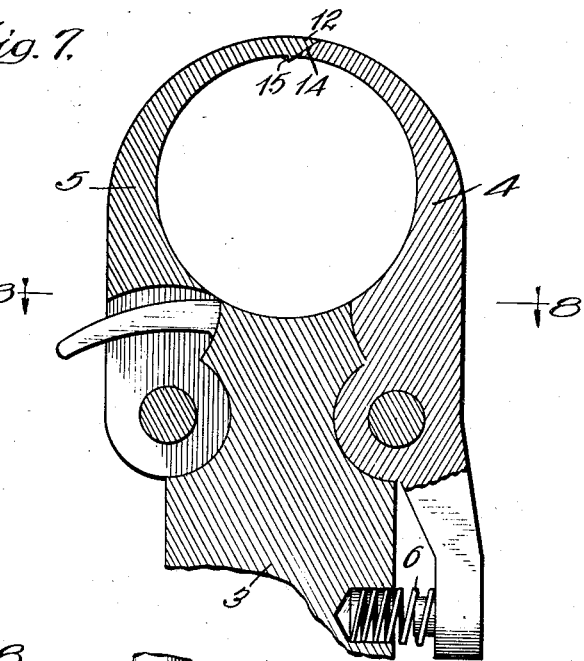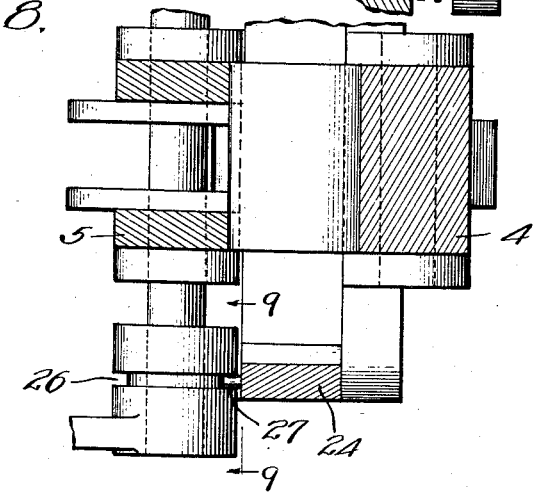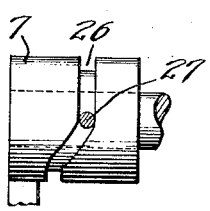

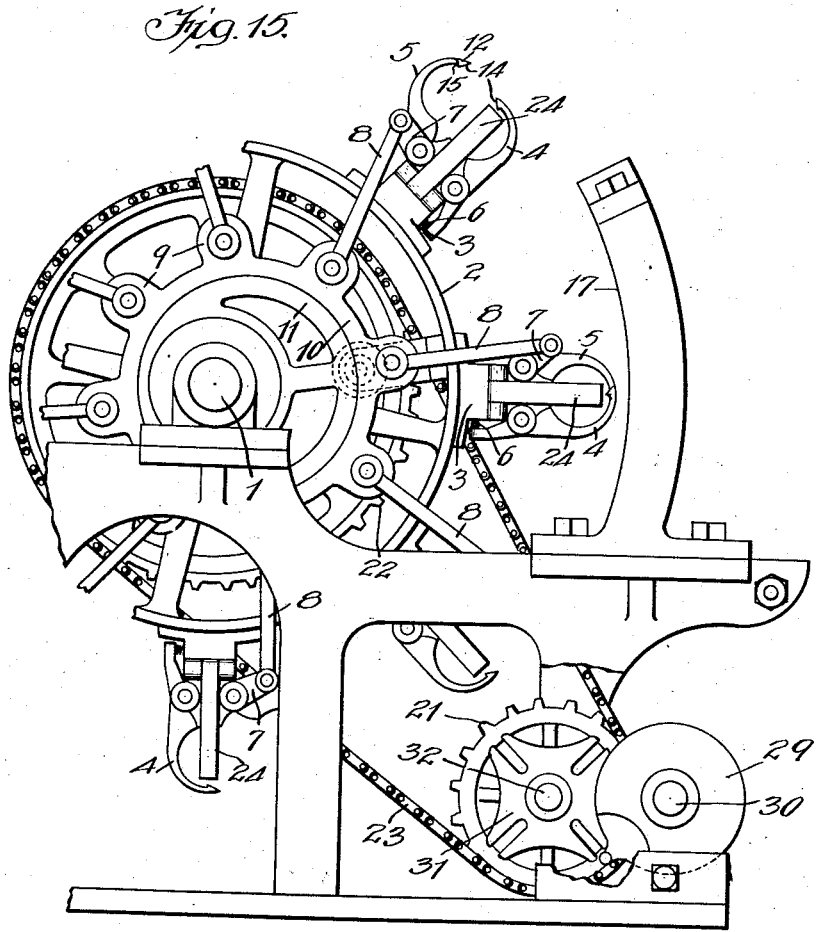
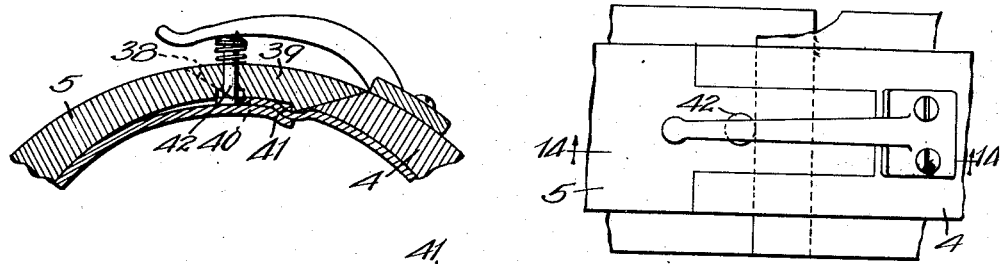
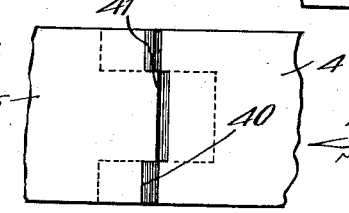

UNITED STATES PATENT OFFICE.

HARRY N. McEWEN AND WILLIS J. ANTHONY, OF ESCANABA, MICHIGAN.

VENEER OR PAPER PACKAGING MACHINE.

1,289,497.  Specification of Letters Patent.  Patented Dec. 31, 1918.

Application filed May 29, 1917. Serial No. 171,618.

*To all whom it may concern:*

Be it known that we, HARRY N. MCEWEN and WILLIS J. ANTHONY, both of Escanaba, Delta county, Michigan, citizens of the United States, have invented certain new and useful Improvements in Veneer or Paper Packaging Machines; and we do hereby declare the following to be a full, clear, and exact description of the invention, such as will enable others skilled in the art to which it appertains to make and use the same.

This invention has for its object to provide a machine for forming tubular containers for tooth-picks, clothes pins and other merchandise of a similar nature capable of being held in place by a band tightly wound around a quantity of the same without requiring the use of any end members or covers for the ends of the package.

The main object of the invention is to provide a machine of this character in which the material adapted to be formed into the tube, and which may consist of paper, veneer or similar suitable material having a certain degree of stiffness combined with sufficient flexibility to enable it to be formed into the tube, and which is first cut to predetermined size, may be inserted in the machine and automatically bent first to concavo-convex form to receive the articles to be packed therein; and which closes the tube around the contents of the package, and thereafter binds or connects the ends of the tube to complete the package ready for market.

A further object of the invention is to provide a machine of this character which will form either a butt or lap joint tube around the merchandise to be packed, and which is simple, durable, efficient and easily operated.

In the accompanying drawings illustrating a suitable embodiment of the invention and the packages formed thereby, Figure —1— is a perspective view of a butt joint tubular package adapted to be made in the machine.

Fig. —2— is a similar view of a lap joint tubular package adapted to be made thereby.

Fig. —3— is a view in side elevation of a machine constructed in accordance with the invention.

Fig. —4— is an end elevation of the same.

Fig. —5— is a fragmentary detail view in side elevation showing one of the pairs of package-forming jaws of the machine.

Fig. —6— is a fragmentary detail section through the meeting ends of one of the package-forming jaws or elements of the machine.

Fig. —7— is a detail longitudinal section of a pair of tube-forming jaws on the line 7—7 of Fig. —4—.

Fig. —8— is a detail section on the line 8—8 of Fig. —7—.

Fig. —9— is a detail section on the line 9—9 of Fig. —8— showing a groove cam.

Fig. —10— is a fragmentary detail section showing a pair of tube-forming jaws for producing lap-joint tubes.

Fig. —11— is a fragmentary view in end elevation of same looking upon top of Fig. —10—.

Fig. —12— is a fragmentary detail top plan view showing the meeting end portions of a modified construction of a pair of package-forming jaws adapted for forming the lap joint package.

Fig. —13— is a fragmentary detail bottom plan view of the same.

Fig. —14— is a fragmentary detail section on the line 14—14 of Fig. —12—.

Fig. —15— is a fragmentary side elevation similar to Fig. —3—, showing a modified form of construction of the machine.

The machine comprises a suitable frame carrying the bearings for the shaft 1 of a drum 2. The latter is provided on its peripheral surface with a plurality of radially disposed supports 3 upon each of which two jaws 4 and 5 respectively, are pivotally mounted. The said jaws have opposed concave faces adapted, when said jaws are in closed position, to present a cylindrical container therebetween. The jaws 4 are maintained yieldingly in a predetermined position by means of relatively strong springs 6 engaging the same, and also engaging the supports 3, and are adapted to yield only to excessive pressure occasioned by the insertion of more material between the jaws 4 and 5 than can be readily accommodated in the cylindrical space formed therebetween when said jaws are closed about the tube constituting the container.

Rigid with each of the jaws 5 is a crank arm 7 which is connected by means of a connecting rod or pitman 8 with a projection 9 of an eccentric strap 10; said strap being mounted upon an eccentric 11 rigid with the frame of the machine. The said connecting rods or pitmen 8 are adapted to be reciprocated during the rotation of the drum 2 relatively to the eccentric 11, to open and close said jaws 4 and 5, or turn the jaws 5 to open and closed position, respectively.

As shown in Figs. —5—, —6— and —7— the meeting ends of the jaws 4 and 5 are provided with interfitting formations, that is to say, the end of the jaw 5 is provided with a projection 12 which is adapted to be received in a corresponding recess 13 between the side edges of the jaw 4 or vice versa. The said meeting surfaces at the ends of the projections 12 and the opposing end wall of the recess 13 are beveled. At the inner ends of the beveled faces of the projections 12 of the jaw 5 and of the similarly beveled ends of the projections 14 of the jaws 4, are shoulders 15 extending substantially radially of the semi-cylindrical faces of the said jaw members, and which constitute stops for engaging the ends of the strip of material adapted to be received between said jaws, and formed thereby into a tube.

In Figs. —3— to —9— inclusive, the jaws 4 and 5 are shown as constructed to produce butt joint tubes in which event the shoulders 15 of the jaws become flush with each other as said jaws move to closed position.

While said jaws are open and as they approach the uppermost point in their travel, each of them receives a rectangular sheet of the material of which the tube is to be formed, said sheet being preferably inserted in the position shown in Fig. —5— so that the ends thereof engage the shoulders 15. At the substantially highest point in the travel of the jaws after receiving the said sheet, the tooth-picks, clothes-pins, or the like are inserted to extend parallel with the axes of the jaw members which then gradually close as they travel through an arc of substantially ninety degrees. The sheets are of greater width than the jaws 4 and 5 so that their side edge portions, constituting the end portions of the finished package, project beyond the side edges of the jaws, the said projecting end-portions being adapted to receive staples spanning the abutting edges or butt-joint of the tube to permanently close the same and retain the contained merchandise.

The stapling is effected by means of stapling mechanism of well-known construction carried by a reciprocable stapling head 16 mounted in suitable guides 17 carried by the frame of the machine. The said stapling head is reciprocated by means of the pitman 18 pivotally connected with the said head and with the crank-pin of a disk 19 mounted on the drive-shaft 20 of the machine. The latter is geared by means of sprockets 21 and 22 mounted on said drive-shaft and rigid with said drum, respectively, and a sprocket chain 23, to rotate said drum so that for each revolution of said drive-shaft 20 one of said pairs of tube-forming jaws will have attained its closed position opposite the said stapling head 16. The connection between the latter and the drive-shaft is such that the stapling head moves in unison with the closed jaws opposing the same during a short arc, and by means of suitable gearing and connection not shown, the staple driving mechanism of the stapling head is actuated to drive staples into the end portions of the tubes as the jaws attain their closed positions successively.

Coacting with the staple driving mechanism of the stapling head 16, are anvil members 24 each of which consists of an arm pivotally mounted upon the supports 3 opposite the ends of the jaw-members. Each of these arms is provided at its outer end with a wedge-shaped projection 25 which is adapted to enter the opposing end of the tube as the latter approaches and reaches the position in which stapling thereof is effected and becomes disposed in the path of the ends of a staple driven through the tube, and effects clenching thereof. The said anvil members are maintained normally in position so that the projections 25 are disposed outwardly of the ends of the tube. In the hubs of the cranks 7 and in cylindrical portions 25$^a$ at the other ends of the crank-shafts with which the jaw members 5 are rigid are groove cams 26 in which pins 27 of the pivotally mounted anvil members engage, said cams being adapted to turn said anvil members to cause the projections 25 thereof to enter the ends of the tubes as the latter are closing.

After the tube is stapled the jaws containing the same gradually open in an obvious manner and permit the successively completed packages with their contents to drop out.

In Fig. —15—, we have shown a modified form of construction of the machine in which the drum is moved intermittently instead of continuously by means of the Geneva movement comprising the actuating member 29 on the drive-shaft 30 and the star-wheel 31 on a countershaft 32 carrying the sprocket 21. It will be obvious, of course, that where the drum is intermittently rotated through arcs corresponding to the separation of contiguous pairs of jaws 4 and 5, the stapling head will be rigid with respect to the frame of the machine, and the stapling operations performed during the intervals of rest of the drum, as the jaws 4 and 5 successively present the tubes in proper position relatively to the staple drivers.

In some instances lap-joint tubes are preferable, especially when the same is made of paper. Obviously if lap-joints are desired the jaws must be constructed to cause the ends of the sheets to pass each other as the jaw pairs approach their closed positions.

This may be accomplished in several ways, examples being shown in Figs. —10— to —14— inclusive.

In Figs. —10— and —11— we have shown a pair of jaws for forming lap-joint tubes, said jaws being modified only at their outer meeting end portions, the interfitting parts of the latter being of greater length and including a pivoted member 33 adapted to swing outwardly against the action of a spring 34 as the jaws approach their closed positions. This swinging movement is effected by causing the projection 35 to ride upon the cam surface constituting the bottom of the recess 36 extending from the edge of the jaw member 4 rearwardly, thus causing the shoulder 37 of said projection 35 to move out of engagement with the end of the tube-forming sheet at the same time that the latter strikes the beveled ends of the projections of the other jaw member, and is thus guided to pass inwardly of and overlap the other end of the sheet.

This function may be variously performed, as for example, shown in Figs. —12— to —14— inclusive, in which the projections 38 and 39 at the ends of the respective jaw members are of a length sufficient to overlap each other to the extent that the ends of the sheet are desired to overlap, this being determined by the distance separating the shoulders 40 and 41 when the jaws are closed. The jaw 5 carries a spring-supported radially reciprocable plunger 42, the shank 43 of which projects through an opening therein and into the path of an overhanging cam projection 44 mounted on the jaw 4, and which serves to force said plunger 42 inwardly to disengage the edge of the sheet from the shoulder 41 as said jaws approach their closed position. The said end of the sheet is thus caused to pass inwardly of and overlap the opposite end portion of the sheet.

Obviously the machine may be geared to a source of power in any desired well-known manner.

While we have illustrated preferred embodiments of our invention in the accompanying drawings it will be understood, of course, that the invention may be embodied in other modified and varied structures and all necessary and desired changes in details of construction may be made without departing from the invention as defined in the appended claims.

We claim as our invention:

1. In a machine of the kind specified, a tube forming mechanism comprising a pair of opposed concavo-convex jaws pivotally movable with respect to each other on an axis exterior of the substantially cylindrical opening presented therebetween when closed, means on said jaws for engaging the ends of a strip of material adapted to be formed into a cylinder as said jaws close, and mechanism for effecting opening and closure of said jaws.

2. In a machine of the kind specified, a tube forming mechanism comprising a pair of opposed concavo-convex jaws pivotally movable with respect to each other on an axis exterior of the substantially cylindrical opening presented therebetween when closed, a shoulder contiguous to the outer end of the concave face of each jaw against which the ends of a strip of veneer or the like inserted in said jaws are adapted to abut and be moved toward each other as said jaws approach their closed position, and mechanism for effecting opening and closure of said jaws.

3. In a machine of the kind specified, a tube forming mechanism comprising a pair of jaws presenting opposed concave faces and movable from and toward each other to receive a strip of material and form the same into a tube, means on said jaws for engaging the ends of the strip for preventing the same from projecting from the open space of said jaws as the latter approach each other to bend said strip.

4. In a machine of the kind specified, a tube forming mechanism comprising a pair of jaws presenting opposed concave faces and movable from and toward each other to receive a strip of material and form the same into a tube, an inwardly projecting shoulder at one end of the concave face of each jaw against which the ends of the strip are adapted to abut for preventing the same from projecting from the open space of said jaws as the latter approach each other to bend said strip.

5. In a machine of the kind specified, a tube forming mechanism comprising a pair of jaws presenting opposed concave faces and movable from and toward each other to receive a strip of material and form the same into a tube, means on said jaws for engaging the ends of the strip for preventing the same from projecting from the open space of said jaws as the latter approach each other to bend said strip, said means disposed to effect contact of the end portions of the strips engaged thereby with each other as said jaws attain their closed position.

6. In a machine of the kind specified, a tube forming mechanism comprising a pair of jaws presenting opposed concave faces and movable from and toward each other to receive a strip of material and form the same into a tube, an inwardly projecting shoulder at one end of the concave face of each jaw against which the ends of the strip are adapted to abut for preventing the same from projecting from the open space of said jaws as the latter approach each other to bend said strip, said jaws disposed to effect contact of the end portions of the strips engaged thereby with each other as said jaws attain their closed position.

7. In a machine of the kind specified, a tube forming mechanism comprising a pair of jaws presenting opposed concave faces and movable from and toward each other to receive a strip of material and form the same into a tube, means on said jaws for engaging the ends of the strip for preventing the same from projecting from the open space of said jaws as the latter approach each other to bend said strip, said means disposed to effect contact of the end portions of the strips engaged thereby with each other as said jaws attain their closed position, a pair of anvil members associated with said pair of jaws each having a projection adapted to enter one end of the tube formed by said jaws opposite to and to be overlapped by the end portions of the strip, the said projections being adapted to clench the staples driven through the contacting end portions of the strip for permanently joining the same.

8. In a machine of the kind specified, a tube forming mechanism comprising a pair of jaws presenting opposed concave faces and movable from and toward each other to receive a strip of material and form the same into a tube, means on said jaws for engaging the ends of the strip for preventing the same from projecting from the open space of said jaws as the latter approach each other to bend said strip, said means disposed to effect contact of the end portions of the strips engaged thereby with each other as said jaws attain their closed position, a pair of anvil members associated with said pair of jaws each having a projection movable in the direction of the axis of the tube and each adapted to enter one end of the latter opposite to and to be overlapped by the end portions of the strip, the said projections being adapted to clench the staples driven through the contacting end portions of the strip for permanently joining the same.

9. In a machine of the kind specified, a tube forming mechanism comprising a pair of jaws presenting opposed concave faces and movable from and toward each other to receive a strip of material and form the same into a tube, means on said jaws for engaging the ends of the strip for preventing the same from projecting from the open space of said jaws as the latter approach each other to bend said strip, said means disposed to effect contact of the end portions of the strips engaged thereby with each other as said jaws attain their closed position, a pair of anvil members associated with said pair of jaws each having a projection movable in the direction of the axis of the tube and each adapted to enter one end of the latter opposite to and to be overlapped by the end portions of the strip, the said projections being adapted to clench the staples driven through the contacting end portions of the strip for permanently joining the same, and mechanism for simultaneously closing said jaws and imparting relative movement to said anvil members toward each other.

10. A machine of the kind specified comprising a carrier, a plurality of equally spaced pairs of tube-forming jaws mounted thereon and each comprising a pair of opposed concavo-convex jaws pivotally movable with respect to each other on an axis exterior of the substantially cylindrical opening presented therebetween when closed, means on said jaws for engaging the ends of a strip of material adapted to be formed into a cylinder as said jaws close, mechanism for imparting movement to said carrier, and mechanism operatively associated with said jaws for effecting opening and closure thereof at different points in the travel of said carrier.

11. A machine of the kind specified comprising a frame, a member rigid therewith, a traveling carrier mounted on said frame, a plurality of tube-forming elements mounted on said carrier and operatively connected with said rigid member for actuation thereby as said carrier moves, a member adapted to carry staple-driving mechanism associated with said carrier, and staple-clenching members associated with said tube-forming elements.

12. A machine of the kind specified comprising a frame, a member rigid therewith, a traveling carrier mounted on said frame, a plurality of tube-forming elements mounted on said carrier and operatively connected with said rigid member for actuation thereby as said carrier moves, a member adapted to carry staple-driving mechanism associated with said carrier, and staple-clenching members associated with said tube-forming elements, and operatively connected with the same for causing said clenching members to enter the ends of the tubes formed as the forming mechanism approaches the member adapted to carry the staple-driving mechanism.

13. A machine of the kind specified comprising a frame, a member rigid therewith, a traveling carrier mounted on said frame, a plurality of tube-forming elements mounted on said carrier and operatively connected with said rigid member for actuation thereby as said carrier moves, a member adapted to carry staple-driving mechanism associated with said carrier, and staple-clenching members associated with said tube-forming elements, and operatively connected with the same for causing said clenching members to enter the ends of the tubes formed as the forming mechanism approach the member adapted to carry the staple-driving mechanism, and means for holding said last-named means and said carrier against relative movement during intervals that the tube-forming mechanisms are successively positioned relatively to the said member to enable the staple-driving operation to be performed.

In testimony whereof we have signed our names.

HARRY N. McEWEN.
WILLIS J. ANTHONY.